United States Patent [19]
Patterson et al.

[11] Patent Number: 5,992,706
[45] Date of Patent: Nov. 30, 1999

[54] GAS-OPERATED, DUAL-CHAMBER, FLUID LUBRICATING MATERIAL DISPENSER HAVING A PRESSURE RELIEF VALVE

[75] Inventors: Denis A Patterson; Geoffrey O Patterson, both of Upton upon Severn, United Kingdom

[73] Assignee: Wymark Ltd., United Kingdom

[21] Appl. No.: 09/022,300

[22] Filed: Feb. 11, 1998

[51] Int. Cl.⁶ .................................................. B67D 5/42
[52] U.S. Cl. ............................................................ 222/386.5
[58] Field of Search ............................... 222/386.5, 386, 222/387, 394, 397, 399, 396, 389; 137/68.19, 68.23, 533.11, 467

[56] References Cited

U.S. PATENT DOCUMENTS

| | | | |
|---|---|---|---|
| 4,706,698 | 11/1987 | Short, III | 137/68.1 |
| 5,232,124 | 8/1993 | Schneider et al. | 222/397 |
| 5,275,196 | 1/1994 | Mitchell et al. | 137/224 |
| 5,598,901 | 2/1997 | Graf | 184/39 |

FOREIGN PATENT DOCUMENTS

| | | |
|---|---|---|
| 0030820 | 6/1981 | European Pat. Off. ............ 137/68.19 |
| 0 598 867 | 6/1994 | European Pat. Off. . |
| 785573 | 1/1940 | France ..................................... 222/394 |
| 1 102 666 | 2/1968 | United Kingdom . |
| 1 442 699 | 7/1976 | United Kingdom . |
| 1 496 841 | 1/1978 | United Kingdom . |
| 2 184 491 | 6/1987 | United Kingdom . |
| 2 195 148 | 3/1988 | United Kingdom . |
| WO 93/10391 | 5/1993 | WIPO . |
| WO 93/25841 | 12/1993 | WIPO . |

OTHER PUBLICATIONS

Cascio et al, Low Pressure Liquid Dispense System, IBM Technical Disclosure Bulletin vol. 20 No. 1, Jun. 1977.

*Primary Examiner*—Andres Kashnikow
*Assistant Examiner*—Jorge Bocanegra
*Attorney, Agent, or Firm*—Howson and Howson

[57] ABSTRACT

An automatic dispenser of fluent lubricating material comprising a first chamber (23) for containing the fluent lubricating material, a second chamber (13), means for generating gas within the second chamber and pressure relief means (11, 15, 16; and 21, 24–28) for venting the first chamber to atmosphere on occurrence of an over-pressure.

5 Claims, 1 Drawing Sheet

GAS-OPERATED, DUAL-CHAMBER, FLUID LUBRICATING MATERIAL DISPENSER HAVING A PRESSURE RELIEF VALVE

FIELD OF THE INVENTION

This invention relates to a self-contained automatic dispenser of fluent lubricating material that is driven by gas generated within the dispenser (e.g. by galvanic reaction). Such a dispenser will hereafter be referred to as a "dispenser of the kind specified".

BACKGROUND OF THE INVENTION

Several dispensers of the kind specified are known, some of which function by injecting a galvanic element into an electrolyte (see for example GB-A-1102666). Others use electric cells to pass current through electrolytes to generate the dispensing gas (see for example GB-A-1496841 and WO 93/25841). In these known devices, the gas generated is contained in an expansion chamber and expands against a piston to expel the fluent lubricating material into an appropriate receptacle, e.g. a bearing.

Dispensers of the kind specified normally contain sufficient motive power-source materials to generate the appropriate quantity of gas to expel all the fluent lubricating material with only a small surplus of the power-source materials. This surplus is deliberately restricted to ensure that the dispenser does not become over-pressurised after it is spent and the piston has come to the end of its stroke. The normal operating gauge pressure within a dispenser of the kind specified is in the range from about 0.5 bar to about 3 bar depending on the resistance offered to the flow of material leaving the dispenser, e.g. the resistance caused by channels into which a lubricant is injected. Even when the piston reaches the end of its stroke, having expelled all the fluent material, the expanded gas chamber is sufficiently large to ensure that any surplus gas generated does not materially increase the pressure (and certainly does not rise to a dangerous level).

However, it can happen that a dispenser of the kind specified can be fitted unwittingly to, for example, a lubrication point in which the lubricant channels have become blocked by dirt or hardened grease. If the pressure generated by the dispenser is insufficient to force the lubricant past the obstruction, the piston will be unable to move as the lubricant in the dispenser will be substantially incompressible and the expansion chamber, which will normally have very little free gas space initially, will be unable to expand. As the galvanic reaction continues and gas continues to be generated, the gas pressure inside the dispenser can rise to an unsafe level, e.g. in excess of 10 bars gauge, giving rise to the possibility of a dangerous explosive burst.

SUMMARY OF THE INVENTION

The present invention seeks to provide a dispenser of the kind specified having pressure relief means for avoiding the danger of a burst in the circumstances outlined above.

According to the present invention there is provided an automatic dispenser of fluent lubricating material comprising a first chamber for containing the fluent lubricating material and provided with an outlet, and normally closed pressure relief means, a second chamber, and means for generating gas within the second chamber to cause, during normal operation of the dispenser, the second chamber to expand and the first chamber to contract thereby expelling the fluent lubricating material from the first chamber through said outlet, the normally closed pressure relief means being openable, on occurrence of an over-pressure within said first chamber, to vent the first chamber and being constructed and arranged to remain open after occurrence of said over-pressure within said first chamber even if the pressure within said first chamber is subsequently reduced below said over-pressure.

By providing the pressure relief means in the first chamber, the escape of possibly harmful electrolytes, from the second chamber is avoided. In addition, the provision of the pressure relief means in a wall of the first chamber which holds the fluent lubricating material to be dispensed. Ensures that, on occurance of, excessive pressure in the first chamber, fluent lubricating material is expelled thereby indicating to the user that an excessive or over-pressure exists in the chamber, e.g. indicating that the outlet is blocked.

In one embodiment of the invention, a frangible membrane spanning across a valve release passage can be provided. Conveniently the membrane can be a part of, e.g. adhered to or integral with, a soft plastic plug which can be fitted into an appropriate receptacle formed in a casing of the dispenser.

In a second embodiment a compressible member (e.g. a rubber ball) can be held captive at an inlet end of an escape passage which includes an orifice intermediate a shoulder at the inlet end against which the compressible member is normally held and a rest end region of the channel to which the member is forced on actuation of the relief valve.

A variety of other forms of simple and inexpensive pressure relief valves can be conceived and, in the absence of indications to the contrary, can be used in a dispenser in accordance with the invention.

BRIEF DESCRIPTION OF THE DRAWINGS

Embodiments of the invention will now be further described, by way of example only, with particular reference to the accompanying drawing, in which.

DETAILED DESCRIPTION OF THE PREFERRED EMBODIMENTS

Figure 1:
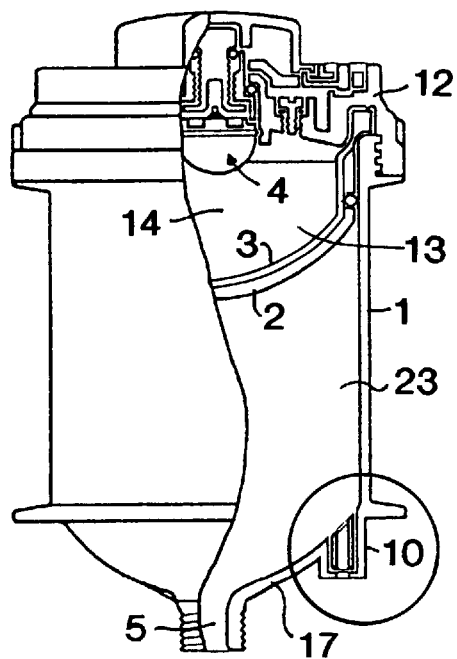
FIGS. 1 and 1A show a first embodiment of dispenser.
Figure 1A:
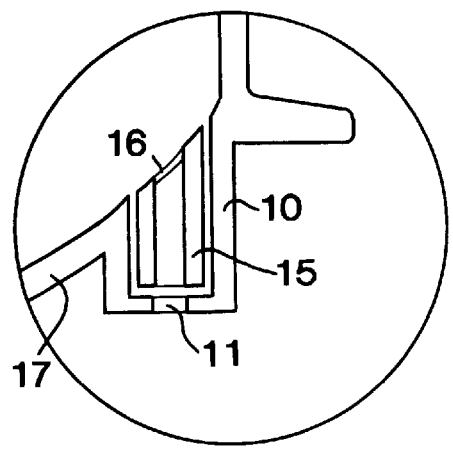

With reference to FIGS. 1 and 1A, a dispenser of the kind specified for dispensing a lubricant is shown partially sectioned and includes a cylindrical casing 1 within which a piston 2 slides. A rubber envelope 3 is fixed at the upper end of the casing 1 and defines, with an end closure 12 of the casing, an expansion chamber 13 containing an electrolyte 14. A lubricant chamber 23 is defined in the lower part of the casing 1 below, or in front of the piston 2. The operation and construction of dispensers of this type is more fully described, for example, in WO 93/10391.

In the dispenser shown in FIGS. 1 and 1A, a socket 10 with an external escape orifice 11 is moulded into or affixed to an end wall 17 containing a lubricant discharge outlet 5. In use, a galvanic element 4 is released into the expansion chamber 13 to react with the electrolyte and generate gas within the chamber 13. The rubber envelope 3 expands and pushes the piston 2 downwardly in the casing. As the expansion chamber 13 expands and the lubricant chamber 23 contracts, lubricant is forced out through the outlet 5 of the chamber 23 into a bearing (not shown) to which the dispenser is connected.

A moulded plug 15 (e.g. of polyethylene or rubber) which incorporates a membrane 16, the thickness of which has been found by experiment to burst at a suitable gauge pressure between 5 and 10 bars is fitted into the socket 10. In the case of a membrane 16 made of low density polyethylene, the membrane will typically have a thickness of 0.25 mm and will be designed to break or burst at a gauge pressure of about 6 bar. During the construction of the dispenser the plug 15 (which will cost only a few pence) can be inserted into the socket 10 to provide the required pressure relief valve or device. Thus if in use an over-pressure occurs in the lubricant chamber 23, the membrane 16 will burst or fracture allowing the release of lubricant from within the chamber 23 to atmosphere to relieve the pressure within the chamber 23 and to provide an indication that an over-pressure has occurred in the chamber 23, e.g. indicating a blockage of the outlet 5.

Figure 2:
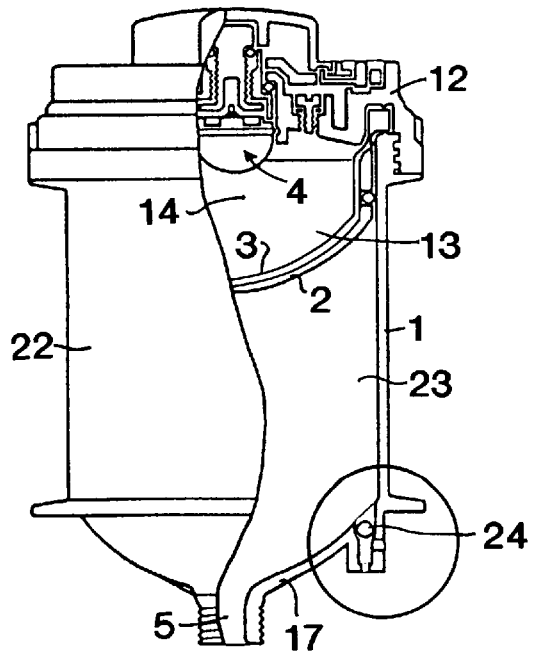
FIGS. 2 and 2A show a second embodiment of dispenser.
Figure 2A:
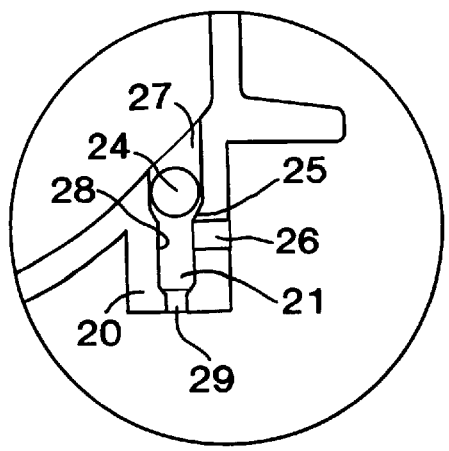

FIGS. 2 and 2A show a second arrangement of a lubricant dispenser in which a pressure relief valve is provided in the lubricant chamber 23. In this case, a socket 20 with a channel 21 therethrough is moulded into or affixed to the external end wall 17 of the lubricant chamber 23. The channel 21 has a cylindrical inner end portion 27, a reduced diameter cylindrical intermediate portion 28 joined to the portion 27 by a shoulder 25 and an outer end portion 29. An accurately moulded compressible ball 24 (e.g. of synthetic or natural rubber) is tightly fitted into the inner end portion 27 and seats against the shoulder 25. An escape orifice 26 exiting to atmosphere opens into the intermediate portion 28. If the pressure inside the chamber 23 exceeds a predetermined level, the ball 24 is forced far enough into the channel 21 to uncover the orifice 26 through which lubricant can then flow to atmosphere to relieve the pressure. The reduction in diameter of the intermediate portion 28 can be found by experiment and preferably allows the ball to move at a gauge pressure of between 5 and 10 bars. Typically the ball 24 comprises a nitrile ball of 45 shore hardness and having a diameter of 5.5 mm. In this case the inner end portion 27 suitably has a diameter of 5.3 mm and the intermediate end portion 28 suitably has a diameter of 5.1 mm. Movement of the ball 24 from the inner end portion 27 to the intermediate end portion 28 to reveal the orifice 26 will occur at a pressure of about 6 bar.

In both the embodiments described, the normally closed pressure relief means is designed to remain open after actuation even if the actuating pressure subsequently drops to below the actuating pressure.

I claim:

1. An automatic dispenser of fluent lubricating material comprising means including a wall defining a first chamber for containing the fluent lubricating material and provided with outlet means, means defining a second chamber, means for generating gas within the second chamber to cause, during normal operation of the dispenser, the second chamber to expand and the first chamber to contract thereby expelling the fluent lubricating material from the first chamber through said outlet, and, provided in said wall, normally closed pressure relief means openable, on occurrence of an over-pressure within said first chamber, to cause the fluent lubricating material to be vented from said first chamber, the pressure relief valve being constructed and arranged to remain open after occurrence of said over-pressure within said first chamber even if the pressure within said first chamber is subsequently reduced below said over-pressure.

2. An automatic dispenser according to claim 1, in which said wall comprises an end wall.

3. An automatic dispenser according to claim 1, in which the pressure relief means comprises valve release passage means and a frangible membrane spanning across the valve release passage means which is intended to break an occurrence of said over-pressure within said first chamber.

4. An automatic dispenser according to claim 3, in which said membrane is part of a plug fitted into a receptacle of the valve release passage means.

5. An automatic dispenser according to claim 1, in which the pressure relief means comprises a compressible member and channel means having an inner end communicating with said first chamber and provided with a shoulder against which the compressible member is normally held, an outer end to which the compressible member is moved, and wedged into, on occurrence of said over-pressure in said first chamber and an escape passage opening into the channel means between said inner and outer ends for venting said first chamber to atmosphere through said inner end of the chamber and the escape passage.

\* \* \* \* \*